Oct. 19, 1965   J. D. FINLEY ET AL   3,213,222
SWITCHGEAR SHUTTER
Filed April 12, 1963   2 Sheets-Sheet 1
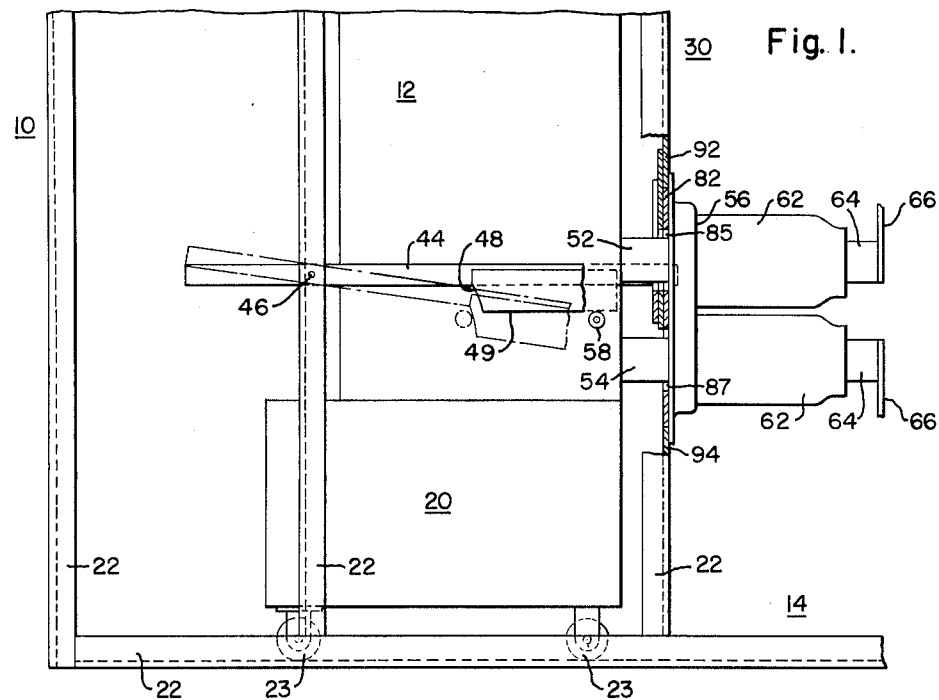
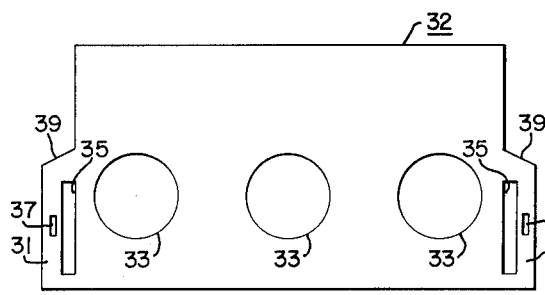
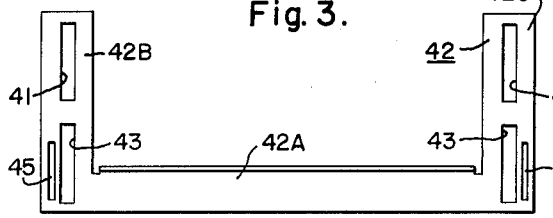
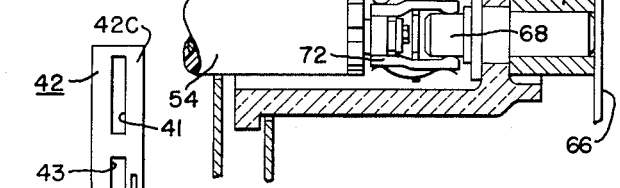
WITNESSES:
John L. Chopp
James F. Young
INVENTOR
James D. Finley and
Russell E. Frink
BY
Clement L. McHale
ATTORNEY

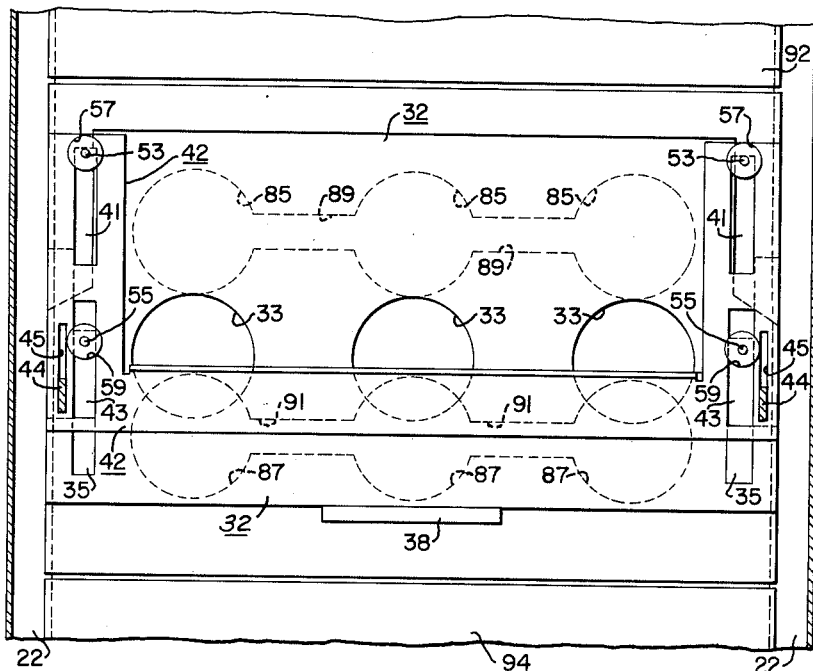
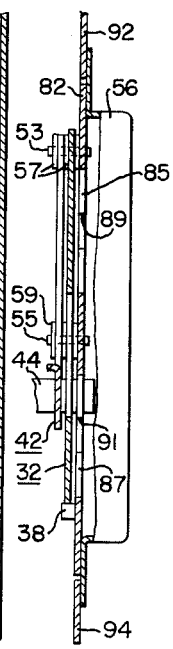
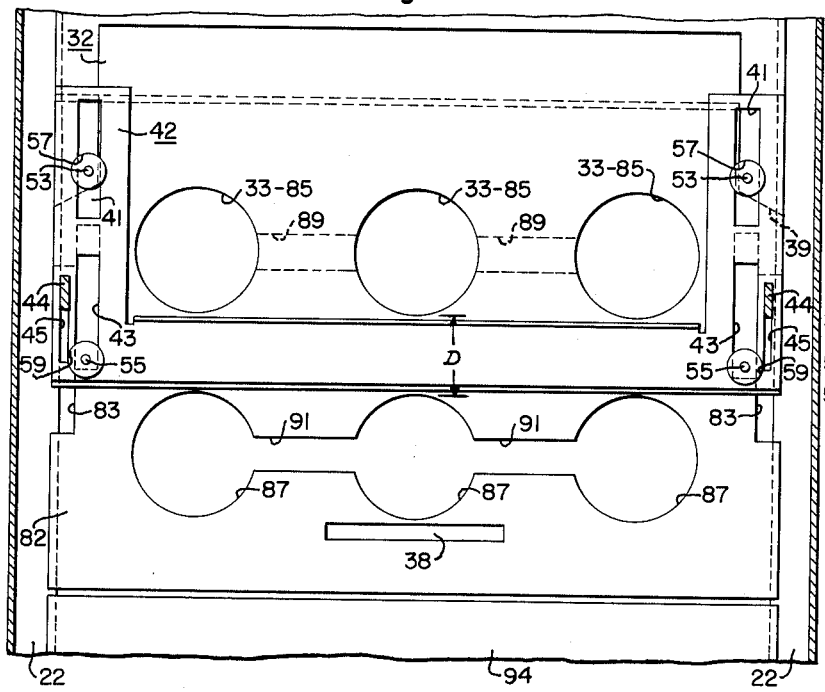
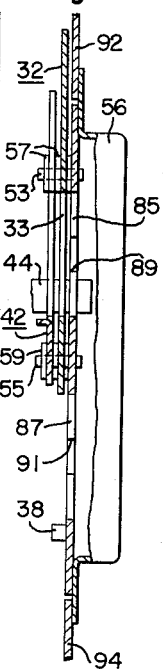

United States Patent Office 3,213,222
Patented Oct. 19, 1965

3,213,222
SWITCHGEAR SHUTTER
James D. Finley, Monroeville, and Russell E. Frink, Forest Hills, Pa., assignors to Westinghouse Electric Corporation, Pittsburgh, Pa., a corporation of Pennsylvania
Filed Apr. 12, 1963, Ser. No. 272,683
5 Claims. (Cl. 200—50)

This invention relates generally to metal-clad or metal enclosed switchgear and more particularly to shutter mechanisms for switchgear apparatus having circuit interrupters or circuit breakers of the drawout type disposed in metal housings or cubicles.

In the construction of switchgear equipment of the drawout type, the primary movable disconnecting contacts of a circuit interrupter or circuit breaker are often mounted on insulating bushings which are inserted into a plurality of pairs of insulating tubes which are mounted in the associated switchgear housing to engage stationary disconnecting contacts disposed in the insulating tubes. In order to protect operating or maintenance personnel who may have occasion to enter the switchgear housing, a shutter means which is usually formed from sheet metal has been employed in the past to automatically close the openings to the insulating tubes when the associated circuit breaker is removed from its normal operating position. As the required voltage and current ratings of the circuit breakers employed in switchgear apparatus of the drawout type increase in new applications, the required size of the openings to the insulating tubes provided in the switchgear housing also increase. When the openings to the insulating tubes are relatively large, certain problems arise in providing a suitable shutter means if the relative distance or spacing between the openings of each pair of openings is to be kept to a minimum. It is, therefore, desirable to provide an improved shutter means which is particularly adapted for use where the openings to the insulating tubes in a switchgear housing are relatively large compared to the spacing or distance between the openings of each pair of openings.

It is an object of this invention to provide a new and improved shutter means for switchgear apparatus.

Another object of this invention is to provide an improved means for controlling communication through closely spaced openings between adjacent compartments of a switchgear apparatus.

More specific objects of this invention are to provide an improved shutter means for controlling communication through pairs of openings which are relatively large compared to the distance therebetween.

Other objects of the invention will, in part, be obvious and will, in part, appear hereinafter.

For a fuller understanding of the nature and objects of the invention, reference should be had to the following detailed description taken in connection with the accompanying drawings, in which:

FIGURE 1 is a view partly in side elevation and partly in section, of a portion of a metal-clad switchgear unit embodying the principal features of the invention;

FIG. 2 is a front elevational view of a first shutter member employed in the switchgear unit shown in FIG. 1;

FIG. 3 is a front elevational view of a second shutter member employed in the switchgear unit of FIG. 1;

FIG. 4 is a fragmentary view partly in side elevation and partly in section showing the primary movable and stationary disconnecting contacts of the circuit breaker included in the switchgear unit of FIG. 1 in the engaged position;

FIG. 5 is an enlarged view, partly in front elevation and partly in section, of the shutter means employed in the switchgear unit of FIG. 1 in the closed position;

FIG. 6 is an enlarged view, partly in side elevation and partly in section, of the shutter means shown in FIG. 5 in the closed position;

FIG. 7 is an enlarged view, partly in front elevation and partly in section, of the shutter means employed in the switchgear unit of FIG. 1 in the open position; and FIG. 8 is an enlarged view, partly in side elevation and partly in section of the shutter means shown in FIG. 7 in the open position.

Referring now to the drawings and FIGS. 1 and 4 in particular, there is illustrated a portion of a metal-clad or metal enclosed switchgear cell or housing 10 which may be constructed by securing sheet metal members to angle frame members 22 in a manner well known in the art. A circuit interrupter or circuit breaker 20 is disposed in the cell 10 and may be moved horizontally into and out of the cell on the wheels 23 which run on rails or tracks (not shown) disposed at the bottom of the cell. The cell 10 includes a front compartment 12 in which the circuit breaker 20 is disposed and a rear compartment 14 in which the power conductors or bus members 66 may be disposed for connection to the circuit breaker 20 through primary disconnecting contacts.

The circuit breaker 20 includes a plurality of pairs of substantially horizontal insulating bushings 52 and 54 with the bushings of each pair being spaced from one another in a common vertical plane and with the different pairs of bushings being laterally spaced from one another. As is shown in FIG. 4, each of the bushings 52 and 54 has mounted at the inner end thereof a primary movable disconnecting contact 72 which is disposed to engage a primary stationary contact 68 which is disposed inside an insulating tube 62 which in turn is mounted in the rear compartment 14 of the cell 10. Each of the stationary contacts 68 is electrically connected to one of the power conductors 66 through an electrical conductor or stud which is electrically insulated by suitable means, such as the insulating tube 64. The circuit breaker 20 is of the general type which is described in greater detail in Patent 2,900,464, issued August 18, 1959, to R. E. Frink and P. Olsson, which is assigned to the same assignee as the present application.

In order to separate or isolate the front compartment 12 from the rear compartment 14 of the cell 10, the partition member 30 is disposed therebetween. In particular, the partition member 30 comprises the upper sheet metal member 92, the lower sheet metal member 94 and the intermediate sheet metal member 82 which may be secured to the vertical angle member 22 at the rear sides of the front compartment 12. In addition, the partition member 30 includes the bracing or supporting member 56 which is dish-shaped or pan-shaped in configuration and which is disposed just behind the intermediate sheet metal member 82 to provide additional bracing for the partition member 30 and to support the insulating tubes 62, as best shown in FIG. 4. The supporting member 56 may be secured to the sheet metal members 92, 94 and 82 as well as to the vertical angle members 22 at the rear corners of the front compartment 12. Both the intermediate sheet member 82 and the supporting member 56 include a plurality of laterally spaced pairs of openings or apertures, as indicated at 85 and 87 for the intermediate sheet member 82 in FIGS. 1 and 5, with the corresponding openings in the intermediate sheet member 82 and the supporting member 56 being substantially aligned with one another and with the corresponding insulating bushings 52 and 54 of the circuit breaker 20 about a horizontal axis through the center of each of said openings. The aligned openings in the intermediate sheet member 82 and the supporting member 56 permit the respective pairs of bushings 52 and 54 of the circuit breaker 20 to pass through the partition member 30 when said circuit breaker is in its normal operating position as shown in FIG. 1.

In order to reduce hysteresis losses in the cell structure 10 when large magnitudes of alternating current are flowing between the powder conductor 66 and the circuit breaker 20, the upper and lower sheet metal members 92 and 94, respectively, the intermediate sheet metal member 82 and the supporting member 56 are preferably formed from a suitable non-magnetic material, such as aluminum. In order to reduce eddy current losses in the partition member 30 when large magnitudes of alternating current are flowing between the power conductors 66 and the circuit breaker 20, the adjacent openings 85 or 87 in the intermediate sheet member 82 and the corresponding openings in the supporting member 56 may be laterally connected by slots or recesses, such as the slots 89 and 91 shown for the intermediate sheet member 82 in FIG. 5, to prevent the formation of a closed conductive path around the conductors disposed inside the insulating bushings 52 and 54 of the circuit breaker 20. It is to be noted that the latter losses would otherwise result since the sheet metal members included in the partition member 30 lie in a plane which is substantially perpendicular to the conductors to carry the magnetic flux which results when current flows in said conductors which pass through the insulating bushings 52 and 54 of the circuit breaker 20 when said circuit breaker is in its normal operating position. It is also important to note that the openings 85 and 87 of each pair of openings in the intermediate sheet member 82 and the corresponding openings in the supporting member 56 are vertically spaced from one another by a predetermined distance or spacings, as indicated at D in FIG. 7, which is less than the diameter or maximum cross dimension of the openings 85 and 87 in order to keep the construction of the cell 10 as compact as possible.

In order to control communication between the front compartment 12 and the rear compartment 14 through the partition member 30, more specifically through the openings in the intermediate sheet member 82 and the supporting member 56 just described, a shutter means which includes the main shutter 32 shown in FIG. 2 and an auxiliary shutter 42 shown in FIG. 3 is disposed in front of and adjacent to the openings in said intermediate sheet member. In order to slidably support and to guide the vertical movement of the main and auxiliary shutters 32 and 42, respectively, as will be explained hereinafter, the upper and lower guide pins or supporting posts 53 and 55 are disposed at each of the opposite sides of the intermediate sheet member 82 and secured thereto to project outwardly into the front compartment 12 as best shown in FIGS. 5 through 8. The supporting posts 53 and 55 at each side of the intermediate sheet member 82 are vertically spaced from one another as shown in FIGS. 5 through 8.

More specifically, the main shutter 32 which is generally rectangular in configuration is preferably formed from a non-magnetic sheet material, such as aluminum, for the reasons previously discussed in connection with the partition member 30. The main shutter 32 includes a plurally of substantially circular, horizontally spaced openings or apertures 33 therethrough which are preferably of the same size and shape as the openings in the intermediate sheet member 82 and supporting member 56 previously described. Each of the openings 33 in the main shutter 32 is associated with one of the pairs of openings in the intermediate sheet member 82 and the supporting member 56 with the openings 33 being substantially aligned with the upper row of openings 85 in the intermediate sheet member 82 when the main shutter 32 is in the open position, as best shown in FIG. 7. In the closed position of the main shutter 32, the upper portion of the shutter 32 closes the upper row of openings 85 in the intermediate sheet member 82 and the supporting member 56 to prevent communication between the front and rear compartments 12 and 14, respectively, and the openings 33 of the main shutter 32 are disposed approximately intermediate the associated pairs of openings 85 and 87 in the intermediate sheet member 82 and the supporting member 56 as best shown in FIG. 5 with a minor portion of the openings 33 overlapping a portion of the associated openings 87 in the intermediate sheet member 82. The latter overlapping results because the vertical spacing between the row of openings 85 and the row of openings 87 is less than the diameter or maximum cross dimension of the openings 85 and 87. Unless the overlapped openings were otherwise closed off, communication would be permitted between the front and rear compartments 12 and 14 respectively even in the closed position of the main shutter 32. The shutter 32 also includes an offset portion 31 at each side thereof which extends outwardly from the main body of the shutter 32 to form a shoulder portion 39 at each side thereof as shown in FIG. 2. The shutter 32 includes an elongated vertical slot or opening 35 at each side thereof to receive one of the lower supporting posts 55 which permits vertical travel or movement of the shutter 32, as will be explained hereinafter. In addition, the main shutter 32 includes a smaller slot or opening 37 at each side thereof to receive the inner end of one of the actuating levers 44 as will be explained hereinafter.

The auxiliary shutter member 42 is provided to close the overlapped openings of the main shutter 32 and the intermediate sheet member 82 when the main shutter 32 is in the closed position shown in FIG. 5. More specifically, the auxiliary shutter 42 is generally U-shaped in configuration and includes a central yoke portion 42A which extends horizontally across the rear of the front compartment 12 and the upwardly extending portions 42B and 42C which extend upwardly from the central portion 42A at the outer ends thereof. The auxiliary shutter 42 includes the upper and lower elongated vertical slots or openings, 41 and 43, respectively at each side thereof in the vertically extending portions 42B and 42C to receive the upper and lower supporting posts 53 and 55, respectively, which pass therethrough at each side of the auxiliary shutter 42 to permit vertical travel or movement of the auxiliary shutter 42. In the open position of the main shutter 32, the corresponding position of the auxiliary shutter 42 is best shown in FIG. 7 with the central portion 42A disposed intermediate the pairs of openings 85 and 87 in the intermediate sheet member 82. In the closed position of the main shutter 32, the corresponding position of the auxiliary shutter 42 is shown in FIG. 5 with the central portion 42A of the auxiliary shutter 42 closing the overlapped portions of the openings 33 and 87 of the main shutter 32 and the intermediate sheet member 82, respectively, as best shown in FIG. 5 to prevent any communication between the front and rear compartments 12 and 14, respectively, when the main shutter 32 and the auxiliary shutter 42 are in the corresponding closed positions. The auxiliary shutter 42 also includes the elongated vertical slots or openings 45 at each side thereof in the vertically extending portions 42B and 42C to receive the inner ends of the actuating levers 44 which pass therethrough, as will be explained hereinafter. It is to be noted that the slots 45 extend farther in a vertical direction than the corresponding slots 37 in the main shutter 32 to permit a certain amount of lost motion in the movement of the auxiliary shutter 42 when the main shutter 32 is actuated for vertical movement, as will be explained hereinafter. In this instance, the auxiliary shutter 42 is disposed in front of the main shutter 32 as best shown in FIGS. 6 and 8, although it is to be understood that the arrangement may be reversed in certain applications where desired.

In order to maintain the spacing between the main shutter 32 and the intermediate sheet member 82 and between the main shutter 32 and the auxiliary shutter 42, the spacer washers 57 are disposed between the respective shutters and between the main shutter 32 and the intermediate sheet member 82 on the respective supporting posts 53 and 55 as best shown in FIGS. 6 and 8. In addition, in order to retain the different shutter members on the supporting posts 53 and 55, the retaining washers 57 are also disposed on the outer ends of the supporting posts 53 and 55 and may be secured thereto by suitable means, such as a fastener or pin.

In order to actuate the shutter means which includes the main shutter 32 and the auxiliary shutter 42 to move vertically in accordance with the horizontal movement of the circuit breaker 20 either into or out of the cell 10 between the two operating positions just described, which include the closed position shown in FIG. 5 and the open position shown in FIG. 7, the actuating lever members 44 are disposed inside the cell 10 and at the opposite sides thereof, as best shown in FIG. 1. Each of the lever members 44 may be rotatably supported by an associated pivot member 46 which in turn may be mounted on one of the vertical angle members 22. As previously mentioned, the inner end of each of the lever members 44 is disposed to pass through the slots 37 and 45 in the main shutter 32 and the auxiliary shutter 42, respectively, at one side thereof in both the closed and opened positions of said shutters and to actuate said shutters to move vertically between said positions when the lever members 44 are rotated in a plane which is substantially parallel to the sides of the cell 10. It is to be noted that the intermediate sheet member 82 includes a slot or recess 83 at each of the outer sides thereof to permit at least limited rotational movement of the lever members 44. Each of the lever members 44 also includes a cam portion comprising a first curved cam portion, as indicated at 48, which is substantially vertical when the circuit breaker 20 is in its normal operating position, as shown in FIG. 1, and a second substantially flat cam portion, as indicated at 49, which is substantially horizontal when the circuit breaker 20 is in the normal operating position shown in FIG. 1. In order to actuate the lever members 44 for rotation about the associated pivot members 46 and in turn to actuate the main shutter 32 and the auxiliary shutter 42 between the different operating positions previously described in accordance with the movement of the circuit breaker 20 either into or out of the cell 10, a roller member 58 is mounted on each side of the circuit breaker 20 to project outwardly therefrom into the plane of movement of one of the lever members 44 to engage the cam portion of one of said lever members whenever the circuit breaker 20 is moved either into or out of the cell 10 and to actuate said lever members for rotational movement.

In explaining the operation of the shutter means, which includes the main shutter 32 and the auxiliary shutter 42, which automatically results upon movement of the circuit breaker 20 either into or out of the cell 10, it will be assumed initially that the shutter means is in the open position as shown in FIGS. 7 and 8 which corresponds to the normal operating position of the circuit breaker 20, as shown in FIG. 1. If the circuit breaker 20 is now moved out of the cell 10 by any suitable means, during the initial movement of the circuit breaker 20 from its normal operating position, as shown in FIG. 1, with the primary movable disconnecting contacts 72 engaging the associated stationary disconnecting contacts 68, the rollers 58 on the circuit breaker 20 will initially engage or bear against the substantially flat cam portions 49 of the lever members 44. Since the roller members 58 will travel along a substantially horizontal line as the circuit breaker 20 is moved out of the cell 10, substantially no rotational movement of the lever members 44 will result since the substantially flat cam portions of the lever members 44 are also disposed to be substantially horizontal in the normal operating position of the circuit breaker 20 shown in FIG. 1. Since no rotational movement of the lever members 44 results during the initial outward movement of the circuit breaker 20, the main shutter 32 and the auxiliary shutter 42 will remain in the open position shown in FIG. 7 to permit the primary movable disconnecting contacts 72 to clear the partition member 30 before the shutter means, which includes the main shutter 32 and auxiliary shutter 42, is actuated to the closed position shown in FIG. 5. When the rollers 58 reach the curved cam portions 48 of the associated lever members 44 upon continued outward movement of the circuit breaker 20, the cam portions 48 of the lever members 44 will then engage or bear against the associated rollers 58 and will follow further movement of the rollers 58 in the outward direction for a predetermined portion of said movement and clockwise rotation or movement of the lever members 44 will result as viewed in FIG. 1. The clockwise movement of the lever members 44 is caused by the force of gravity since the weight of the main shutter 32 and the auxiliary shutter 42 is supported by the inner ends of the lever members 44 when said shutters are in the open position shown in FIG. 7 and in turn by the rollers 58 of the circuit breaker 20 when the circuit breaker 20 is in its normal operating position shown in FIG. 1. When the circuit breaker 20 is moved out of the cell 10 from the position shown in FIG. 1, the support provided to the lever members 44 by the rollers 58 and to the shutters 32 and 42 is removed once the rollers 58 reach the curved cam portions 48 of the lever members 44 and pass said curved cam portion to permit the lever members 44 to rotate in a clockwise direction and the shutters 32 and 42 to move in a downward vertical direction from the open position shown in FIG. 7 to the closed position of said shutters shown in FIG. 5.

It is to be noted that the downward vertical movement of the main shutter 32 is limited by the stop member 38 which is mounted on the intermediate sheet member 82 and which engages the bottom of the main shutter 32 when the main shutter 32 is moved from the open position to the closed position shown in FIG. 5. Similarly, the downward vertical travel or movement of the auxiliary shutter 42, when the auxiliary shutter 42 is moved from the open position shown in FIG. 7 downwardly to the closed position shown in FIG. 5, is limited by the upper supporting posts 53 which engage the upper ends of the vertical slots 41 in the auxiliary shutter 42 and function additionally as stop members during the downward movement to prevent overtravel of the auxiliary shutter 42.

It is to be noted that the vertical length of the slot 45 in the auxiliary shutter 42 is greater than the corresponding vertical length of the slot 37 and the main shutter 32 to provide for a certain amount of lost motion between the movement of the lever members 44 and the movement of the auxiliary shutter 42 as previously mentioned. This is because the distance which the auxiliary shutter 42 is required to travel from the open position shown in FIG. 7 to the closed position shown in FIG. 5 is less than the corresponding travel required for the main shutter 32. In particular, it will be noted, as shown in FIG. 7, that during the initial clockwise movement of the lever members 44 when the circuit breaker 20 is moved outwardly from the cell 10, both the main shutter 32 and the auxiliary shutter 42 will move together in a downward direction from the positions of said shutters shown in FIG. 7 until the auxiliary shutter is stopped by the supporting posts 53 which will engage the upper ends of the upper slots 41 in the auxiliary shutter 42 to prevent further downward travel of the auxiliary shutter 42. The main shutter 32 will continue to travel during the clockwise movement of the lever members 44 until the main shutter 32 reaches its final position as shown in FIG. 5 with the bottom of the main shutter 32 engaging the stop member 38. The additional clockwise movement of the lever members 44 with respect to the auxiliary shutter 42 is permitted by the additional vertical length of the slots 45 which are provided in the auxiliary shutter 42 as compared with the vertical length of the slots 37 provided in the main shutter 32.

On the other hand, if it is assumed that the circuit breaker 20 has been removed from the cell 10 and it is desired to move the circuit breaker 20 back into the cell 10, it is to be noted that the position of the lever members 44 will be angularly displaced in a clockwise direction from the position of the lever members 44 shown in FIG. 1 and that the shutter members 32 and 42 will both be in the corresponding closed positions shown in FIG. 5 of the drawings to prevent accidental communication of any personnel entering the cell 10 with the primary stationary contacts disposed in the rear compartment 14 when the circuit breaker 20 is removed. During the initial movement of the circuit breaker 20 back into the cell 10, the rollers 58 will first engage the curved cam portions 48 of the lever members 44 to rotate or actuate said lever members in a counterclockwise direction as viewed in FIG. 1 about the pivot members 46. The counterclockwise movement of the lever members 44 will continue until the rollers 58 reach the substantially flat cam portions 49 of the lever members 44. During the inward movement of the circuit breaker 20 when the lever members 44 are actuated in a counterclockwise direction, the inner ends of said lever members will move in an upward direction to actuate the main shutter 32 and the auxiliary shutter 42 from the closed positions shown in FIG. 5 to the open positions of said shutters shown in FIG. 7. Upward overtravel of the main shutter 32 will be prevented by the supporting posts 53 which will engage the shoulder portions 39 of the main shutter 32 to prevent further upward travel of the main shutter 32 during the counterclockwise rotation of the lever members 44. Similarly, upward overtravel of the auxiliary shutter 42 will be prevented by the lower supporting posts 55 which will engage or bear against the bottom of each of the lower slots 43 of the auxiliary shutter 42 to prevent further upward travel of the auxiliary shutter 42 during the counterclockwise movement of the lever members 44.

It is to be noted that during initial movement of the main shutter 32 by the lever members 44, lost motion will result in the vertical movement of the auxiliary shutter 42 for the reasons previously mentioned and that the auxiliary shutter 42 will move only during the final portion of the movement of the main shutter 32 from the closed position shown in FIG. 5 to the open position shown in FIG. 7. It is to be noted that the opening of the shutters 32 and 42 will occur at an intermediate point in the movement of the circuit breaker 20 into the cell 10 in advance of the time that the primary movable disconnecting contacts 72 reach the partition member 30 to make sure that said movable disconnecting contacts will be permitted access to engage the stationary contact 68 in the rear compartment 14.

It is important to note that both the main shutter 32 and the auxiliary shutter 42 both move in the same direction during either the opening or closing movement of said shutters which are both actuated by a common lever means.

It is to be understood that in certain applications that the shutter means as disclosed could be modified so that only the main shutter would be actuated by the associated actuating lever means and that projecting portions could be provided on the main shutter 32 to engage corresponding portions on a separately mounted auxiliary shutter to produce the required travel of the auxiliary shutter. It is also to be understood that the teachings of the invention may be applied generally to shutter arrangements to control communication through vertically spaced openings each having a vertical dimension greater than the vertical spacing between the openings. In other words, the shutter means as disclosed may be applied to openings having configurations other than circular openings as disclosed. For example, rectangular openings may be employed with a shutter means as disclosed.

The apparatus embodying the teachings of this invention has several advantages. For example, the shutter means in a switchgear apparatus as disclosed permits relatively close spacing of relatively large pairs of openings between the compartments of a switchgear apparatus while requiring a relatively simple shutter mechanism which is actuated by the movement of an associated circuit breaker automatically. The disclosed shutter means, therefore, permit a more compact switchgear apparatus of the type described.

Since numerous changes may be made in the above described apparatus and different embodiments of the invention may be made without departing from the spirit and scope thereof, it is intended that all the matter contained in the foregoing description or shown in the accompanying drawings shall be interpreted as illustrative and not in a limiting sense.

We claim as our invention:

1. A switchgear apparatus comprising at least two compartments, a partition member disposed between said compartments, said partition member having at least one pair of spaced openings therethrough, a first shutter disposed adjacent to said partition and having at least one opening associated with each pair of spaced openings and disposed to substantially coincide with one of said pair of openings in a first position, the opening of said first shutter being disposed to overlap only the other opening of said pair of openings in a second position, a second shutter disposed adjacent to said first shutter to close only the overlapping portions of said openings in the second position of said first shutter, and means for actuating both of said shutters between said positions in only a single direction at a time.

2. A switchgear apparatus comprising adjacent compartments, a partition disposed between said compartments, said partition including at least one pair of substantially circular openings of a predetermined diameter spaced apart by a distance less than the diameter of said openings, a first movable shutter disposed adjacent to said partition having one opening associated with each pair of openings in said partition, said first shutter being disposed in one position with the opening substantially aligned with one opening of said pair and to permit access to the other opening of said pair and in another position to close one opening of said pair and with the opening of said first shutter overlapping the other opening of said pair, a second shutter disposed adjacent to said first shutter to close the overlapped portions of said openings in said another position of said first shutter, and means for actuating both of said shutters between said positions in only one direction at a time.

3. A switchgear apparatus comprising adjacent compartments, a partition disposed between said compartments and having at least one pair of spaced openings therethrough, a first movable shutter having at least one opening associated with each pair of said openings, said first shutter being disposed adjacent to said partition with each opening substantially aligned with one of the openings of the associated pair and to also permit communication between said compartments through the other opening of said pair in one operating position, said first shutter being disposed to close one of the openings of each pair with the major portion of each opening in said first shutter being disposed between the openings of the associated pair and the minor portion of each opening in said first shutter overlapping the other opening of the associated pair in another operating position displaced from said first operating position, the spacing between said pair of spaced openings being less than the maximum dimension of each opening in the direction of movement of said first shutter between said operating positions, and a second movable shutter disposed adjacent to said first shutter to close the overlapped portions of said openings in said another operating position of said first shutter in a first position corresponding to the latter position of said first shutter and to be disposed between the respective pairs of openings in a second position corresponding to said one position of said first shutter.

4. A switchgear apparatus comprising adjacent compartments, a partition disposed between said compartments and having at least one pair of spaced openings therethrough, a first shutter having at least one opening associated with each pair of said openings, said first shutter being disposed adjacent to said partition with each opening substantially aligned with one of the openings of the associated pair and to also permit communication between said compartments through the other opening of said pair in one operating position, said first shutter being disposed to close one of the openings of each pair with the major portion of each opening in said first shutter being disposed between the openings of the associated pair and the minor portion of each opening in said first shutter overlapping the other opening of the associated pair in another operating position displaced from said first operating position, a second shutter disposed adjacent to said first shutter to close the overlapped portions of said openings in said another operating position of said first shutter in a first position corresponding to the latter position of said first shutter and to be disposed between the respective pairs of openings in a second position corresponding to said one position of said first shutter, and means for reciprocally actuating both of said shutters between their respective positions in only a single direction at a time.

5. A switchgear apparatus comprising adjacent compartments, a partition disposed between said compartments, said partition including at least one pair of openings of a predetermined size and shape spaced apart vertically by a distance less than the maximum vertical dimension of said openings, a first movable shutter having one opening associated with each pair of openings in said partition, said first shutter being arranged in one position with the opening substantially aligned with one opening of said pair and to permit access to the other opening of said pair and in another position to close one opening of said pair and with the opening of said first shutter overlapping the other opening of said pair, and a second shutter arranged to close the overlapped portions of said other opening in said another position of said first shutter.

References Cited by the Examiner

UNITED STATES PATENTS 3,121,144  2/64  Tjebben _____ 200—50

FOREIGN PATENTS 881,704  11/61  Great Britain.

BERNARD A. GILHEANY, *Primary Examiner.*